United States Patent [19]
Wu et al.

[11] Patent Number: 5,906,001
[45] Date of Patent: May 18, 1999

[54] METHOD AND APPARATUS FOR PERFORMING TLB SHUTDOWN OPERATIONS IN A MULTIPROCESSOR SYSTEM WITHOUT INVOKING INTERRUP HANDLER ROUTINES

[75] Inventors: William S. Wu, Cupertino, Calif.; Stephen S. Pawlowski, Beaverton; Peter D. MacWilliams, Aloha, both of Oreg.

[73] Assignee: Intel Corporation, Santa Clara, Calif.

[21] Appl. No.: 08/770,733

[22] Filed: Dec. 19, 1996

[51] Int. Cl.[6] .................................................... G06F 13/14
[52] U.S. Cl. .............................................. 711/154; 711/141
[58] Field of Search ..................................... 711/166, 141, 711/136, 154, 6

[56] References Cited

U.S. PATENT DOCUMENTS

| | | | |
|---|---|---|---|
| 5,317,705 | 5/1994 | Gannon | 711/6 |
| 5,497,480 | 3/1996 | Hayes et al. | 711/166 |
| 5,542,062 | 7/1996 | Taylor et al. | 711/3 |
| 5,555,420 | 9/1996 | Sarangdhar et al. | 395/739 |
| 5,574,878 | 11/1996 | Onodera | 711/207 |
| 5,574,936 | 11/1996 | Ryba | 395/800.3 |

*Primary Examiner*—John W. Cabeca
*Assistant Examiner*—Christopher S. Chow
*Attorney, Agent, or Firm*—Blakely, Sokoloff, Taylor & Zafman LLP

[57] ABSTRACT

Prior art methods of maintaining coherency among multiple TLBs in a multiprocessor system were time-consuming. One microprocessor halted all other microprocessors in the system, and sent an interrupt to each of the halted microprocessors. Rather than invoking an interrupt handler, the TLB shootdown operation of the present invention provides for a TLB flush transaction communicated between multiple processors on a host bus. One microprocessor issues a TLB flush request on the host bus. The TLB flush request includes a page number. The microprocessors receiving the request invalidate the TLB entry corresponding to the page number.

16 Claims, 5 Drawing Sheets

METHOD AND APPARATUS FOR PERFORMING TLB SHUTDOWN OPERATIONS IN A MULTIPROCESSOR SYSTEM WITHOUT INVOKING INTERRUP HANDLER ROUTINES

FIELD OF THE INVENTION

The field of the invention relates to page table coherency in a multiprocessor computer system. More specifically, the invention relates to a method and apparatus for performing TLB shootdown operations in a multiprocessor system.

BACKGROUND OF THE INVENTION

Computer systems often employ several different memory devices that are accessible to the system microprocessor. As such, the system microprocessor typically includes one or more memory management functions for managing the various memory devices. One memory management function that is implemented within the Pentium AE Pro processor manufactured by Intel Corporation of Santa Clara, Calif., is known as paging. Paging provides a mechanism by which virtual memory addresses may be mapped into physical addresses corresponding to memory blocks, or "pages." A page of memory is set to be a fixed size, such as 4 kilobytes. Each of the pages may be stored in either a quick-access memory device, such as dynamic random access memory ("DRAM"), or on a slower-access mass storage device, such as a magnetic or optical disk.

FIG. 1 illustrates a block diagram of a prior art virtual-to-physical address translation. The virtual address 200 includes three fields that are used to translate the virtual address into a physical address within a page of memory. The directory field 202 is an index that points to an entry 211 within a page table directory 210. The page table directory entry 211 in turn points to a page table 220. Thus, there exists one page table for each entry within the page directory 210.

Once the appropriate page table 220 has been located, the table field 204 of the virtual address is used to index a particular entry 221 within the page table. This page table entry (PTE) 221 points to a page of physical memory 230. Thus, for every PTE within page table 220, there exists a page of physical memory. Using the PTE 221, the microprocessor checks to see if the page 230 is in system memory (e.g., DRAM). If not, the page is retrieved from the system disk and loaded into system memory.

Once the appropriate page of physical memory 230 has been loaded, the offset field 206 of the virtual address is used to index a particular address 231 within the page 230. Thus the physical memory address 231 is translated from the virtual address 200.

As can be appreciated from the above description, address translation may take a large number of bus cycles, degrading system performance. Thus, prior art computer systems improve performance by caching the most recently-accessed PTEs within a translation cache, or translation lookahead buffer (TLB).

FIG. 2 illustrates a block diagram of a virtual-to-physical address translation using a TLB 360. The directory field 302 of the virtual address 300 is used to look up a tag entry 311 within the TLB 360. The tag entry 311 is then compared with the table field 304 of the virtual address 300. If the tag entry 311 and the table field 304 match, the match signal 340 is asserted, indicating that the physical address translation may be performed using the TLB 360.

The physical address entry 321 and valid bit entry 331 are both associated with the tag entry 311 of the TLB 360. So long as the valid bit entry 331 indicates that the physical address 321 is valid, and there is a tag match, then the physical address 321 is used to point to a page of physical memory 350. Once the page 350 is loaded into system memory (if required), then the offset field 306 of the virtual address 300 is used to index the physical address 351 of the data within the page 350.

As was mentioned herein above, each entry of the TLB 360 includes a valid bit, e.g. valid bit 331. The valid bit 331 indicates whether or not the physical address 321 still points to the correct page of system memory 350. One situation in which the TLB entry would be invalid is where a PTE (e.g., entry 221 of FIG. 2) changes due to a modification by an operating system or software routine. In such a case, the physical address 321 within the TLB would no longer point to the correct page of memory.

One way in which an operating system or software routine may invalidate the TLB entry is by asserting the invalidate page (INVPLG) instruction, coupled with an argument that indicates the virtual address of the PTE that was changed. The INVPLG instruction is executed by first checking to see if a physical address stored in the TLB corresponds to the INVPLG argument. If found, the valid bit associated with the TLB entry is deasserted. Typically, the INVPLG instruction is a privileged instruction, such that only the most privileged software routines may assert this instruction.

For computer systems including more than one microprocessor, called "multiprocessor" systems, each microprocessor may include its own TLB. All of the microprocessors, however, may share the same physical memory. As such, the TLBs located within each of the microprocessors must be coherent with each other.

One prior art method of maintaining coherency among several caches is referred to as "snooping." Snooping is typically used to maintain coherency for data caches. Each microprocessor monitors the memory transactions performed by all of the other microprocessors, that is, it "snoops" on the other data caches to see if the memory transaction affected its cache data. While snooping is commonly used to maintain coherency in data caches, it is typically not employed for maintaining TLB coherency.

A common method of maintaining coherency among the TLBs is by performing a TLB "shootdown" operation whenever a page table entry is changed. The shootdown operation ensures that changes to a page table entry get propagated to the other microprocessors' TLBs.

One prior art way of performing a TLB shootdown operation starts with halting all microprocessors in the multiprocessor system. This maintains architectural consistency between all of the microprocessors during the shootdown operation. Once the microprocessors have been halted, a first microprocessor invalidates its own TLB by executing the INVPLG instruction. The first microprocessor then sends an interrupt to the other microprocessors. Upon receiving the interrupt, the other microprocessors invalidate their TLB entries using the INVPLG instruction. The first microprocessor waits for all of the microprocessors to complete the TLB invalidation before bringing them out of the halt state, such that they may continue executing programming instructions.

This prior art method of performing a TLB shootdown operation is time consuming, causing the microprocessors to halt operation for a relatively long time. For example, the software interrupt instruction ("INT"), accompanied with an interrupt vector ("n") is often used to communicate the shootdown to the other microprocessors. The INT instruction operates as a far call instruction. Upon receiving an interrupt instruction, the microprocessor uses the interrupt vector "n" to access a descriptor in an interrupt descriptor table (IDT). The descriptor is then used to access an interrupt gate. The interrupt gate then points to an interrupt handler routine that must be loaded into memory, and executed by the microprocessor. The use of descriptors, gates, and interrupt handlers is time consuming, and therefore degrades performance of the multiprocessor system.

It is therefore desirable to provide for a TLB shootdown operation that reduces an amount of time required to invalidate multiple TLBs. It is further desirable to provide a method of performing a TLB shootdown operation that maintains the consistency of an architectural state of the multiprocessor system while performing the shootdown operation in a reduced amount of time. Moreover, it is desirable to provide a method of performing a TLB shootdown operation without invoking interrupt handler routines.

SUMMARY OF THE INVENTION

A method and apparatus for performing a TLB flush in a multiprocessor system is described. A first and second microprocessor, each including a TLB, are coupled to a bus. The first microprocessor requests a TLB flush transaction by asserting a TLB flush request coupled with a page number on the bus. The second microprocessor detects the TLB flush transaction request and invalidates a TLB entry within its TLB corresponding to the page number.

While the second microprocessor is invalidating its TLB entry, it asserts a busy signal on the bus that is detected by the first microprocessor. The busy signal is deasserted when the second microprocessor has completed invalidating its TLB entry.

BRIEF DESCRIPTION OF THE DRAWINGS

The present invention is illustrated by way of example and not limitation in the accompanying figures.

DETAILED DESCRIPTION

A method and apparatus for performing TLB shootdown operations in a multiprocessor computer system is described. In the following description, numerous specific details are set forth, such as specific components, bus protocols, and signal values, in order to provide a thorough understanding of the present invention. It will be apparent, however, to one skilled in the art that these specific details need not be employed to practice the present invention. In other instances, well known components or methods have not been described in detail in order to avoid obscuring the present invention.

Figure 1:
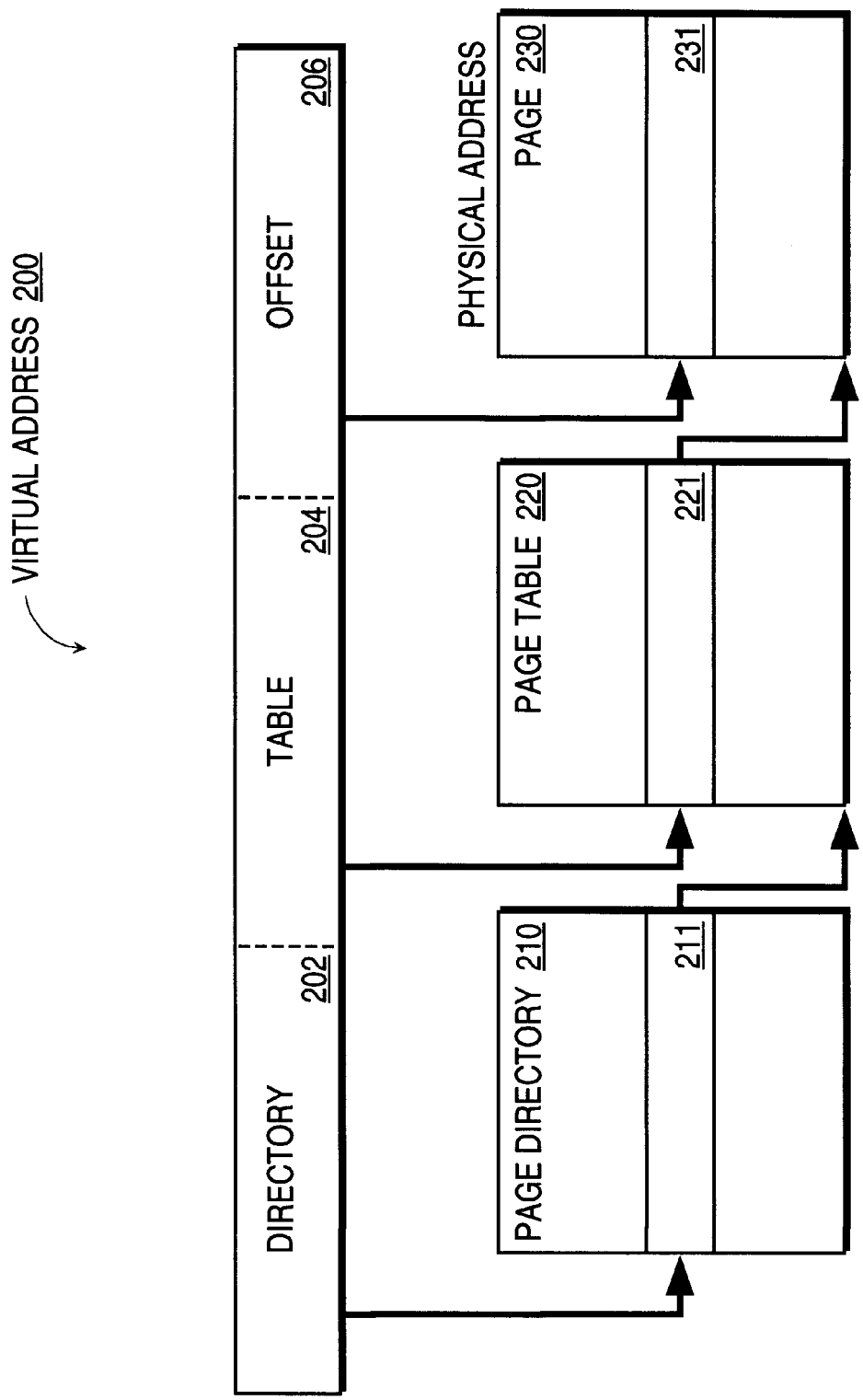
FIG. 1 illustrates a block diagram of a prior art address translation from a virtual address to a physical address.
Figure 2:
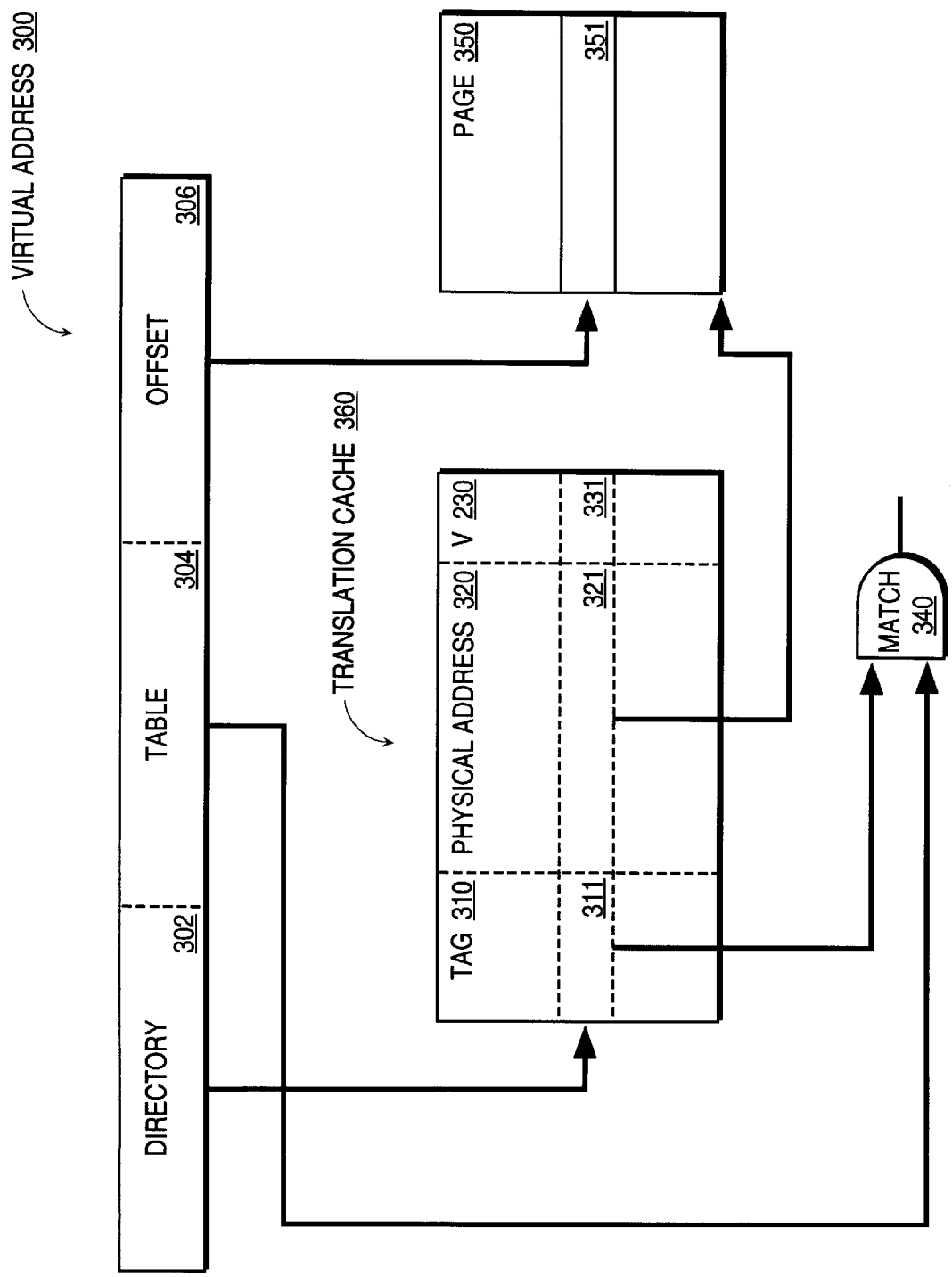
FIG. 2 illustrates a block diagram of a prior art TLB address translation from a virtual address to physical address.
Figure 3:
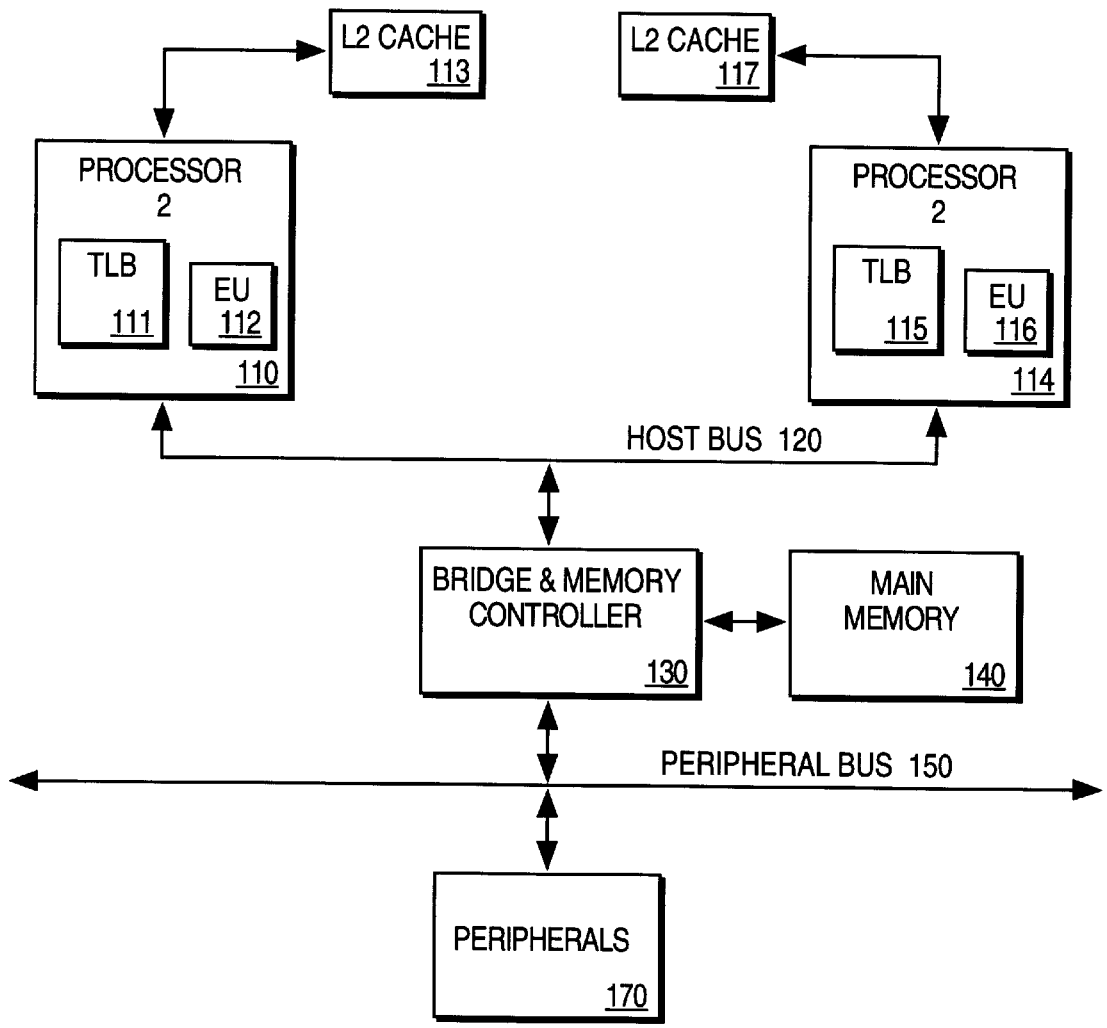
FIG. 3 illustrates a block diagram of a multiprocessor computer system in accordance with one embodiment of the invention.

FIG. 3 illustrates a multiprocessor computer system 100 wherein a TLB shootdown operation of the present invention may be implemented. The first microprocessor 110 is locally coupled to an external second level (L2) cache 113. The second microprocessor 114 is also locally coupled to an L2 cache 117. Each of the microprocessors 110 and 114 include an execution unit, 112 and 116, respectively. The execution unit 112 executes programming instructions received by the microprocessor 110, and the execution unit 116 executes programming instructions received by microprocessor 114. Each of the microprocessors 110 and 114 also includes an internal TLB. The TLB 111 corresponds to microprocessor 110, and TLB 115 corresponds to microprocessor 114. The host bus 120 is a conduit for communications between microprocessor 110, microprocessor 114, and the bridge and memory controller 130.

The bridge and memory controller 130 handles the communication between the microprocessors 110, 114 and the devices coupled to peripheral bus 150. Devices coupled to the peripheral bus 150, such as peripheral device 170, may comprise hard drive interface chips, graphics controller chips, or add-in boards.

The bridge and memory controller 130 handles data transfer requests between the microprocessors 110, 114 and the system main memory 140. For instance, one of the microprocessors 110 or 114 may issue a read or write request on the host bus 120 using standard microprocessor timings. The bridge and memory controller 130 detects the request, and asserts the appropriate signals to main memory 140.

Programming instructions are typically stored in a mass storage device, such as a magnetic or optical disk (not shown). The computer programming instructions are then loaded from the disk into main memory 140 prior to execution. Either microprocessor 110 or microprocessor 114 reads the programming instructions and executes them via the execution unit 112 or 116, respectively.

For one embodiment of the invention, each of the microprocessors 110 and 114 comprise an Intel architecture processor, such as the Pentium AE Pro processor, manufactured by Intel Corporation. For other embodiments of the invention, one or more of the microprocessors of computer system 100 may comprise any general microprocessor for executing programming instructions. Moreover, while the computer system 100 is illustrated as including only two microprocessors 110 and 114, the present invention may be implemented within a multiprocessor computer system including more than two microprocessors.

The TLB shootdown operation of the present invention includes a TLB flush transaction that is communicated between the microprocessors 110 and 114 via the host bus 120. Transactions over the host bus 120 are implemented according to a host bus protocol. While the present invention will be described herein below with reference to a specific host bus protocol, it should be appreciated that the specifics of the protocol are not meant to limit the scope of the invention.

For one embodiment of the TLB shootdown operation, a microprocessor invalidates its own TLB via the INVPLG instruction prior to requesting the TLB flush transaction. This TLB shootdown operation will be described in more detail herein below with reference to FIG. 5.

The TLB flush transaction is considered a processor-to-processor transaction because it is used in communicating between two or more microprocessors. For one embodiment, the host bus is capable of communicating between various types of agents, such as memory devices, I/O devices, and microcontrollers. The TLB flush transaction may also be implemented for communication between any of these agents that include a TLB.

Figure 4:
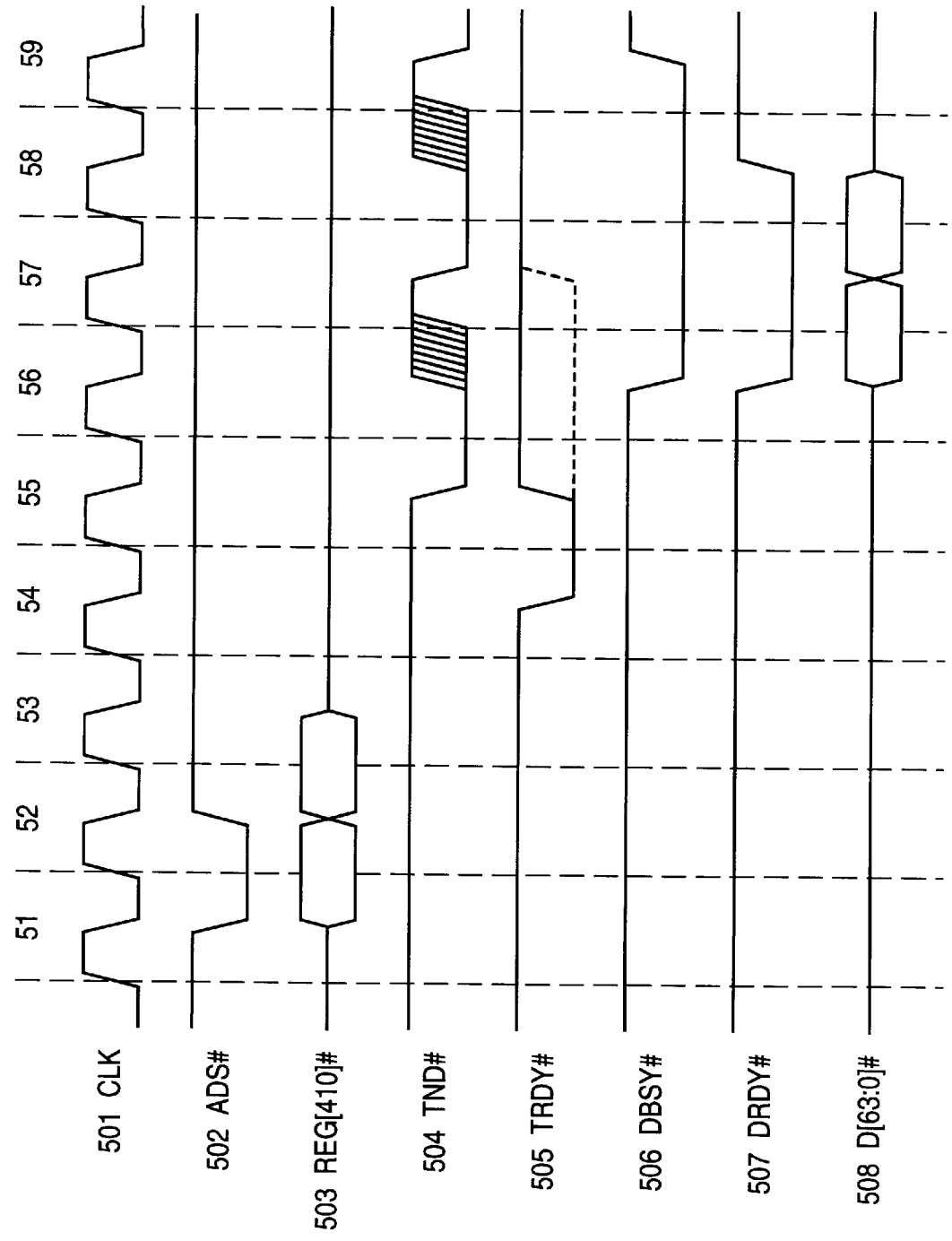
FIG. 4 illustrates a signal diagram of a TLB flush transaction in accordance with one embodiment of the present invention.

FIG. 4 illustrates a timing diagram of one embodiment of the TLB flush transaction of the present invention. In the following description, signal line names are referred to in all capital letters. Names that are not followed by a "#" sign (e.g., CLK) are active-high signal lines, and therefore are considered to be "asserted" when carrying a signal equaling a logical one. Names followed by the "#" sign (e.g., ADS#) are active low signal lines, and are considered asserted when carrying a signal equal to a logical zero. It should be appreciated that the designation of a signal line as active low or active high is not meant to limit the scope of the present invention.

The TLB flush transaction begins with a requesting microprocessor initiating the transaction on the host bus. For one embodiment, the requesting microprocessor must first arbitrate for control of the bus. This is referred to as the "arbitration phase" of the transaction. The arbitration phase may employ a round-robin arbitration algorithm to determine priority among several arbitrators. Arbitration for control of buses is well known in the art, and is therefore not described in detail.

Once the requesting microprocessor has gained control of the host bus, the transaction enters the "request phase." During the request phase, the requesting microprocessor issues a request for a TLB flush transaction on the host bus. For one embodiment, this occurs in two clock cycles.

At clock cycle 51, the requesting microprocessor asserts a signal on the ADS# line 502, along with an encoded request on the five request lines REQ[4:0]#503. These are request lines which already exist in some current microprocessors. For an alternative embodiment, the TLB flush transaction uses dedicated request lines added within the microprocessor. The values of the signals asserted on the request lines REQ[4:0]#503 correspond to the first half of a request for a TLB flush transaction. Five more signals are asserted on the same request lines REQ[4:0]#503 in the second cycle 52 of the request phase which define the complete encoding of the request for TLB flush transaction. For one embodiment, signals corresponding to details of the requested transaction, such as data transfer rates and length of the data transfer requested, are asserted in the second cycle of the request phase.

The TLB flush transaction is known as a "broadcast" transaction on the host bus. This means that the requesting microprocessor broadcasts the TLB flush transaction to all other microprocessors coupled to the host bus. The non-requesting microprocessors coupled to the host bus ("receiving microprocessors") receive the request from the requesting microprocessor. For one embodiment, a "central agent," (e.g. the bridge and memory controller chip 130, FIG. 3) also detects the TLB flush request. The central agent then asserts a signal on the TRDY# line 505 (clock cycle 54) to indicate to the requesting microprocessor that it may begin data transmission for the TLB flush transaction. For an alternate embodiment of the invention, one or more of the receiving microprocessors asserts the transaction ready signal on the TRDY# line 505 to indicate that data transfer may begin.

As can be seen by the dotted line in clock cycles 55–57, the target ready signal on the TRDY# line 505 need not be deasserted within one clock cycle. For another embodiment, the target ready signal may stay asserted until clock cycle 57. The number of clock cycles that the target ready signal remains asserted is not meant to limit the scope of the present invention.

At clock cycle 55, the receiving microprocessors then assert the TLB flush not done, or "busy," signal on the TND# line 504 to indicate that they are busy invalidating their TLBs. For one embodiment, the TND# line 504 comprises a wired-or line such that more than one microprocessor may assert the busy signal at one time. The TND# line 504 will be asserted while any one of the microprocessors is asserting a busy signal on the TND# line 504. While any one busy signal is asserted on the TND# line 504, the requesting microprocessor is stalled, waiting for each of the receiving microprocessors to complete the TLB invalidation.

At clock cycle 56, the requesting microprocessor asserts data signals on the data D[63:0]# lines 508, along with the data ready signal on the DRDY# line 507. This begins the "data phase" of the TLB flush transaction. The data ready signal asserted on the DRDY# line 507 indicates that valid data has been asserted on the data D[63:0]# lines 508. For one embodiment, the data phase is two clock cycles long.

The data signals asserted in the first clock cycle 56 correspond to the TLB entry to be invalidated. For one embodiment, the data signals driven in clock cycle 56 comprise a 49-bit virtual page number (VPN) that indicates the virtual address of the PTE that has been changed. This VPN is used to index the TLB entry to be invalidated.

The second data phase of clock cycle 57 is used to transfer other information about the entry to be invalidated. For instance, the data signals driven in clock cycle 57 may comprise a region identification for identifying a region where the page of memory is located, and a page size identifier that indicates the size of the page to be invalidated.

The data busy signal is asserted by the requesting microprocessor on the DBSY# line 506 during the data phase of the transaction to indicate that the data bus is being used for a two-clock data transfer. For one embodiment, the data busy signal remains asserted on the DBSY# line 506 until one clock cycle after the data phase, clock cycle 59. Alternatively, the data busy signal is deasserted in clock cycle 58.

Once each of the receiving microprocessors has received the data signals driven on lines D[63:0]# 508 during clock cycles 56 and 57, each is responsible for invalidating its TLB entry. As described herein above, for one embodiment this includes executing the INVPLG instruction, using as an argument the VPN received during the data phase. The busy signal is asserted on the TND# line 504, four clocks after the assertion of ADS# 502, while each microprocessor performs the invalidate page instruction. The TND# line 504 is toggled every other cycle due to uncertainty of rising edge due to wired or glitches. The TND# line 504 is sampled once every two clock cycles until it is sampled deasserted. Recall that the TND# line 504 will be asserted as long as one or more microprocessors are asserting a signal on the TND# line 504. Once all microprocessors have completed invalidating their TLBs, and have deasserted the busy signal on the TND# line 504 (not shown in FIG. 4), the TLB flush transaction is completed. Therefore, the requesting microprocessor may commence executing programming instructions.

Figure 5:
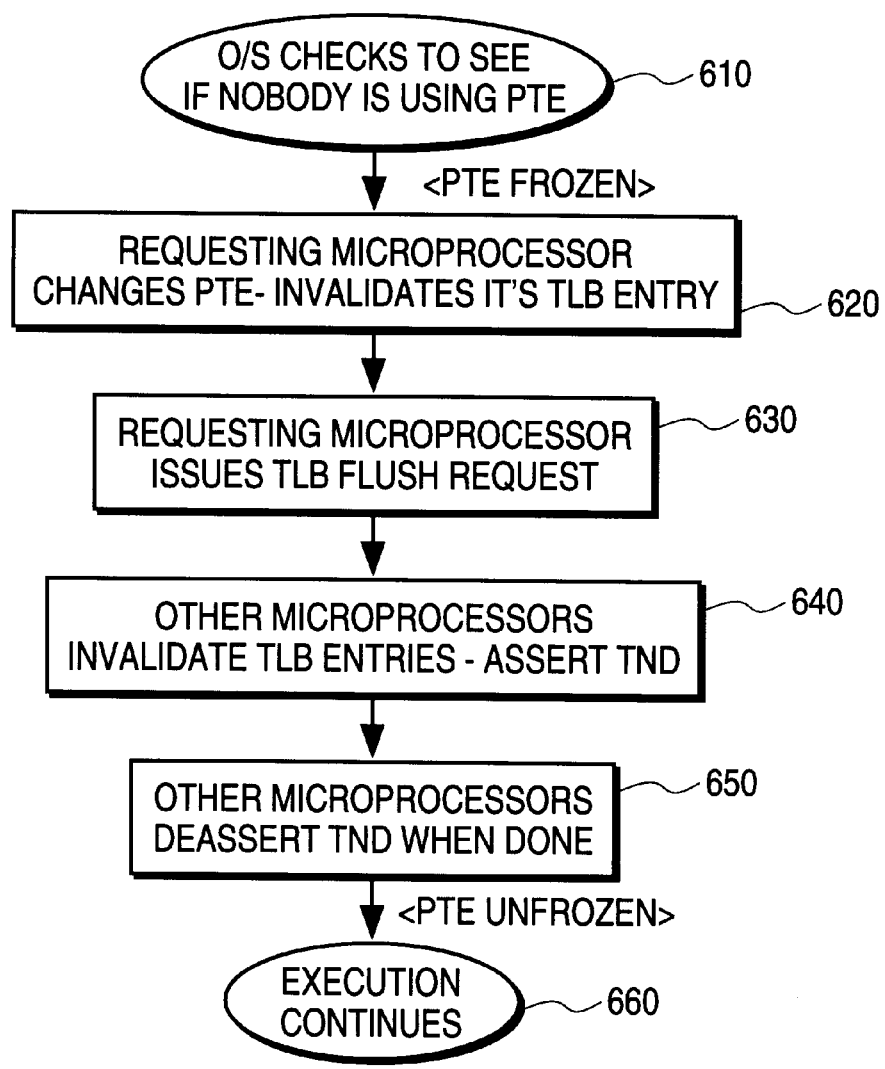
FIG. 5 illustrates a flow diagram of a TLB shootdown operation in accordance with one embodiment of the invention.

FIG. 5 illustrates a flow diagram of a TLB shootdown operation in accordance with one embodiment of the invention. Recall that the reason for performing a TLB shootdown operation is because a page table entry (PTE) is changed by a software routine or operating system. Once the PTE has been changed, any TLB entries corresponding to the PTE must be invalidated.

The first step of the TLB shootdown operation, step 610, involves a check by the operating system prior to changing the PTE. The operating system checks to make sure that none of the microprocessors within the system is currently using the PTE that is to be changed.

Once the operating system has ensured that no microprocessors are using a PTE needing to be changed, one microprocessor is chosen to be the requesting microprocessor. The requesting microprocessor at step 620 changes the PTE. The requesting microprocessor also invalidates its own TLB entry corresponding to the changed PTE. For one embodiment of the invention, the PTE is "frozen" once it has been changed at step 620. This means that the PTE may not be accessed or changed until after the TLB shootdown has completed, thus ensuring architectural consistency within the system. For one embodiment, the operating system is responsible for ensuring that the PTE remains frozen during the entire TLB shootdown operation.

At step 630, the requesting microprocessor issues a TLB flush transaction request on the host bus. The TLB flush transaction request includes two parts: (1) a TLB flush transaction request code, and (2) a data field indicating the page number of the PTE that has changed.

The receiving microprocessors on the host bus receive the TLB flush request at step 640, and first determines whether the page number of the changed PTE is contained in its TLB. If so, the receiving microprocessor invalidates its TLB entry via a TLB invalidate instruction or operation (e.g., INVPLG). While each of the receiving microprocessors is invalidating its TLB, it asserts a busy signal on the TND# signal line. Recall that if any one of the microprocessors is asserting the busy signal on the TND# signal line, the receiving microprocessor is halted from executing programming instructions.

Step 650 illustrates that each receiving microprocessor deasserts its busy signal on the TND# line upon completing the TLB invalidation. For one embodiment, the TND# line is a wired-or, such that if any one microprocessor is asserting a busy signal on the TND# line, the TND# line is asserted. In order to transition from step 650 to step 660, the TND# line must be observed deasserted, such that no microprocessors are asserting a busy signal on the TND# line.

For an embodiment of the TLB shootdown operation, steps 630–650 are performed as described in detail with reference to FIG. 4.

At step 660, the requesting microprocessor signals to the operating system that each of the receiving microprocessors has finished invalidating its TLB. At this point, the changed PTE is unfrozen by the operating system, since the TLB shootdown operation has completed. The requesting microprocessor may continue executing programming instructions because the TND# line is deasserted.

Thus a mechanism for performing TLB shootdown operations in a multiprocessor computer system has been described. As described herein above, the TLB shootdown operation employs a specific TLB invalidation instruction (INVPLG). It should be appreciated, however, that the specific instruction or method used by a microprocessor for invalidating TLB entries is not meant to limit the scope of the invention. Moreover, the particular TLB flush transaction protocol and signal timings may be modified without departing from the scope of the present invention.

In the foregoing detailed description a mechanism for performing TLB shootdown operations in a computer system has been described. The present invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing a TLB flush in a multiprocessor system, comprising the steps of:
    (A) requesting a TLB flush transaction by asserting a TLB flush request coupled with a page number on a set of dedicated signal lines included in a bus, said bus being coupled to a plurality of microprocessors each including a TLB, and wherein a first microprocessor of said plurality of microprocessors requests said TLB flush transaction from remaining microprocessors of said plurality of microprocessors using said dedicated signal lines; and
    (B) upon detecting said TLB flush transaction request, a second of said plurality of microprocessors invalidating a TLB entry corresponding to said page number asserted on said bus, wherein said TLB entry is located within said TLB of said second of said plurality of microprocessors.

2. The method of claim 1, further comprising the step of:
    (C) while said TLB entry is being invalidated in step (B), asserting a busy signal on said bus, wherein during said busy signal said first of said plurality of microprocessors is halted from executing programming instructions.

3. The method of claim 2, further comprising the steps of:
    (D) upon completing said invalidation of said TLB entry, deasserting said busy signal; and
    (E) upon detecting said deassertion of said busy signal, resuming execution of said programming instructions halted in step (C).

4. The method of claim 1, wherein step (B) further comprises performing a TLB invalidate instruction using said page number as the argument of said TLB invalidate instruction.

5. The method of claim 1, wherein prior to step (A), said first of said plurality of microprocessors invalidates a TLB entry corresponding to said page number, said TLB entry residing within said TLB of said first microprocessor.

6. The method of claim 1, wherein prior to performing step (B), said second of said plurality of microprocessors checks its TLB for said TLB entry corresponding to said page number, and performs step (B) if said TLB entry is found.

7. The method of claim 1, wherein step (B) is performed without invoking an interrupt handler routine.

8. A method of performing a TLB flush transaction in a multiprocessor computer system including a host bus coupled to a plurality of microprocessors, each of said plurality of microprocessors including a TLB, said method of comprising the steps of:
    (A) asserting a TLB flush transaction request on a set of dedicated signal lines included in said host bus, wherein said TLB flush transaction request includes a page number, said TLB flush transaction request is asserted by a first microprocessor of said plurality of microprocessors, and said TLB flush transaction request is applied to said remaining microprocessors of said plurality of microprocessors using said dedicated signal lines;
    (B) upon receiving said TLB flush transaction request, invalidating a TLB entry corresponding to said page number, said TLB entry residing within a second of said plurality of microprocessors;

(C) asserting a busy signal while said TLB entry is being invalidated, wherein while said busy signal is asserted, said first of said plurality of microprocessors is halted from executing programming instructions; and (D) upon completing said TLB entry invalidation, deasserting said busy signal.

9. The method of claim 8, further comprising the step of:

(E) upon detecting said deassertion of said busy signal, resuming execution of said programming instructions halted in step (C).

10. The method of claim 8, wherein step (B) further comprises performing a TLB invalidate instruction using said page number as the argument of said TLB invalidate instruction.

11. The method of claim 8, wherein prior to step (A), said first of said plurality of microprocessors invalidates a TLB entry corresponding to said page number, said TLB entry residing within said TLB of said first microprocessor.

12. The method of claim 8, wherein prior to performing step (B), said second of said plurality of microprocessors checks its TLB for said TLB entry corresponding to said page number, and performs step (B) if said TLB entry is found.

13. The method of claim 8, wherein step (B) is performed without invoking an interrupt handler routine.

14. A computer system, comprising:

a bus having a busy signal line, data lines, and a first set of signal lines;

a first microprocessor coupled to said bus, said first microprocessor including a first TLB, said first microprocessor being capable of executing a TLB flush request on said first set of signal lines, said TLB flush request including a page number;

a second microprocessor coupled to said bus, said second microprocessor including a second TLB, and said second microprocessor capable of detecting said TLB flush request, invalidating an entry within said second TLB corresponding to said page number, and asserting a busy signal on said busy signal line, wherein said first microprocessor is halted from executing programming instructions while said busy signal is asserted.

15. The computer system of claim 14, wherein said second microprocessor invalidates said entry within said second TLB by executing a TLB invalidate instruction using said page number as an argument to said TLB invalidate instruction.

16. The computer system of claim 14, wherein said second microprocessor performs said invalidation of said TLB entry without invoking an interrupt handler routine.

* * * * *